US006588109B2

United States Patent
Wilson

(10) Patent No.: US 6,588,109 B2
(45) Date of Patent: Jul. 8, 2003

(54) STRING TRIMMER

(75) Inventor: Michael Wilson, Crook (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/952,037

(22) Filed: Sep. 13, 2001

(65) Prior Publication Data

US 2002/0108257 A1 Aug. 15, 2002

(30) Foreign Application Priority Data

Sep. 14, 2000 (GB) .............................. 0022557

(51) Int. Cl.[7] .............................. A01D 34/84
(52) U.S. Cl. ....................... 30/276; 15/12.7
(58) Field of Search .................. 30/276, 347, 517; 15/12.7

(56) References Cited

U.S. PATENT DOCUMENTS

| 4,338,719 A | * | 7/1982 | Burkholder | .................. 30/276 |
| 4,761,939 A | | 8/1988 | Zerrer | |
| 5,644,844 A | | 7/1997 | Pink | |
| 6,382,325 B1 | * | 5/2002 | Bovj | ...................... 30/276 X |

FOREIGN PATENT DOCUMENTS

| EP | 0 820 690 A1 | 1/1988 |
| GB | 2272624 A | 5/1994 |

* cited by examiner

*Primary Examiner*—Douglas D. Watts
(74) *Attorney, Agent, or Firm*—Harness, Dickey & Pierce, P.L.C.

(57) ABSTRACT

A string trimmer comprising a body wherein a cavity is formed within the body and which is adapted to store at least one cutting member for the string trimmer.

16 Claims, 2 Drawing Sheets

STRING TRIMMER

TECHNICAL FIELD

The present invention relates a string trimmer and in particular to a mechanism for storing spare cutting line on a string trimmer and, more in particular, to a string trimmer using individual pieces of line which are attached to the cutting head

BACKGROUND OF THE INVENTION

String trimmers are portable hand-held outdoor gardening power tools used for cutting soft vegetation, having an electrical motor or a small combustion engine, which rotatingly drives a cutting element. Typically, the cutting element comprises a hub, called a cutting head, and a cutting member attached to and extending radially from the cutting head. A cutting member may take many different forms, like for example, a blade or a filament, formed of a resilient or rigid material and, which may be permanently or detachably fixed to the cutting head. The cutting member is rotatably driven at a speed sufficiently high so that it shears any grass or soft vegetation in its path.

String trimmers can be easily manoeuvred close to vegetation in areas which are inaccessible to a conventional lawn mower or other cutting devices. However, during use the rotating cutting line comes into contact with not only soft vegetation, but also hard objects like, for example, rocks and stones. These hard objects can damage or break the cutting line resulting in the need for frequent replacement of the cutting line during use of the string trimmer.

Some cutting heads have an automatic feed mechanism comprising a reserve of cutting line wound around a spool which is mounted within the cutting head. In use, when the cutting line breaks, the automatic feed mechanism allows the spool to rotate relative to the cutting head, thereby paying out additional cutting line to compensate for the shortening of the working cutting line due to breakage or wear. A cutting head comprising an automatic feed mechanism may be convenient to use but it is also complicated to assemble and expensive to manufacture. Other cutting heads comprise a more simple and inexpensive attachment mechanism for detachably securing a single length of cutting line. Replacement of a worn or broken cutting line requires the user to stop the operation of the string trimmer, wait until the rotation of the cutting head has ceased and replace the old cutting line with a new one. Replacement of the single cutting line is a quick and simple process if the user has spare lengths of cutting line at hand.

During extended or heavy-duty trimming operations, it is possible that the cutting line is exposed to a lot of wear and may need to be replaced several times before completion of the task. Replacement of a cutting line is not an unduly inconvenient task but it may become so if the user does not have spare lengths of cutting line at hand and needs to return to the garden shed or other place of storage. Continual stopping of the task to fetch spare cutting line will soon become a major irritation to the user. A seasoned string trimmer user may carry spare cutting line in his pocket as a precaution against this problem however this is not ideal since it may lead to damage of the spare cutting lines like, for example, when the user sits down. Furthermore the spare cutting lines carried by the user may become lost.

SUMMARY OF THE INVENTION

Accordingly, there is provided a string trimmer comprising a body wherein a cavity is formed within the body and which is adapted to store at least one cutting member for the string trimmer. The body of a string trimmer may comprise at least one handle, a shaft, a motor housing and a protection guard. The cavity may be formed by a member attached to the body of the string trimmer. Alternatively, the cavity may be formed by a cavity wall formed within the body of the string trimmer. The advantage of storing spare cutting lines in a cavity formed within the body of the string trimmer is that these cutting lines are stored together in one location which is immediately accessible to the user of the string trimmer.

Though the cavity can be formed within a handle, the motor housing or the protection guard of such a string trimmer, ideally the cavity is formed within the elongate shaft of the body so that the user has easy access to the cavity.

In some constructions of string trimmer the body may be formed by an elongate metal shaft with a separate handle at one end and a motor housing at the other. Attached to the motor housing is a protection guard. A motor is mounted within the motor housing which rotatingly drives a cutting head. In such a construction, the cavity may be formed in the handle, the motor housing, the protection guard or, the metal shaft. In an alternative construction of string trimmer the body is formed by at least two moulded clam-shells, the cavity being formed by a cavity wall integrally moulded into at least one clam-shell. A clam-shell is a rigid shell, moulded in a metal or, more commonly, plastics material. The shell can be reinforced by cross members on its inner skin. The body of a string trimmer made of two clam-shells which together form a rear handle, an elongate shaft, a motor housing and, in some designs, a front handle, has the advantage of being lighter and cheaper to manufacture than a string trimmer having an elongate metal shaft with a separate handle and motor housing. A cavity wall moulded into one or both of the clam-shells would form an integral part of the clam-shell thus obviating the need to manufacture and attach an additional component to form the cavity wall. One less component provides the advantage of a reduced overall cost in manufacturing a string trimmer.

Preferably, one part of the cavity wall is integrally moulded into the first clam-shell and the other part of the cavity wall is integrally moulded into the second clam-shell in substantially symmetrical fashion, the complete cavity wall being formed when the first clam-shell and the second clam-shell are joined together. A cavity wall moulded in two halves is easier and cheaper to manufacture than a cavity wall moulded in one piece.

Preferably the cavity wall forms a tubular passage having at least one aperture through which a cutting member is capable of being inserted into the tubular passage A tubular passage can be understood to mean an elongate cavity. Either one end or both ends of the tubular passage may be sealed. The length of the tubular passage may be appreciably greater than its breadth. The tubular passage can be sufficiently broad and long to fully enclose one or several cutting lines at the same time. The aperture may be formed in one end of the tubular passage. Alternatively, the aperture may be formed in a side wall of the tubular passage. In either case, if the aperture is located towards the upper end of the tubular passage then a cutting line is held within the tubular passage due to the force of gravity.

Preferably, the shape of the tubular passage is configured such that the cavity wall interacts with a cutting member when a cutting member is located within the tubular passage to secure a cutting member within the tubular passage. This interaction may be, for example, due to a distortion, a constriction or a locking mechanism comprised within the cavity wall, any one of which may be adapted to secure a cutting line once it is located within the tubular passage.

Preferably the tubular passage is curved along its length. This provides the benefit that when a substantially straight resilient cutting member is located within the tubular passage the cavity wall causes a cutting member to bend, frictionally engaging the cavity wall of the tubular passage, thus holding a cutting member in the tubular passage. The curvature of the tubular passage can be constructed so that, when a substantially straight resilient cutting member is inserted into the curved tubular passage, it is forced to make contact with the cavity wall at a number of contact points. One such type of resilient cutting member is a cutting line. When a cutting line is inserted into the curved tubular passage a cutting line bends in order to fit the path formed by the tubular passage. The resilient nature of a cutting line causes it to frictionally engage with the cavity wall at various contact points, the forces required to overcome the friction being sufficient to hold a cutting line within the curved tubular passage. The advantage of a curved tubular passage is that the interaction between a cutting member and the cavity wall provides for a simple and inexpensive mechanism of securing a cutting member within the curved tubular passage.

Preferably the cavity wall of the tubular passage comprises a first straight tubular section at one end, an intermediate curved tubular section where the cavity wall forms a 'v' shape kink, and a second straight tubular section at the other end, the first and second straight tubular sections being substantially co-axial. The 'v' shaped kink frustrates a straight path through the tubular passage. When a substantially straight resilient cutting member is located in the tubular passage it is forced to make contact with the cavity wall at a number of contact points in the region of the 'v' shaped kink and is resiliently deformed by the cavity wall in order to fit the path formed by the 'v' shaped kink. The resilient nature of a cutting member causes it to frictionally engage with the cavity wall at various contact points, the forces required to overcome the friction being sufficient to hold a cutting member in the tubular passage. A feature of the tubular passage comprising an intermediate section where the cavity wall forms a 'v' shaped kink is that the cross-sectional area of the tubular passage can remain substantially the same throughout the first straight, intermediate and second straight tubular sections and is therefore formed without a bottleneck. The absence of any bottlenecks in the tubular passage provides the advantage of maximising the number of cutting members that can be inserted into the pouch.

Preferably a lip is formed adjacent to the aperture, the lip being adapted to retain a cutting member within the tubular passage. The lip can be formed between one end of the tubular passage and the aperture. The lip can enclose the end of a cutting member closest to the aperture when the cutting member is located within the tubular passage. To fully locate a cutting member within the tubular passage one end of the cutting member is inserted through the aperture and moved towards the lower end of the tubular passage. The other end of the cutting member remains out side the tubular passage until the cutting member is deformed so that its other end clears the overhang of the lip, passes through the aperture and locates itself behind the lip and inside the upper end of the tubular passage. A cutting member will not deform and undo the above sequence without intervention on the part of the user, therefore, the enclosure of both ends of a cutting member by the tubular passage and the lip will result in the cutting member being retained. The function of the lip can provide an additional or alternative, simple and inexpensive mechanism of retaining a cutting member within the tubular passage.

Furthermore, if a cutting member is not substantially straight and is instead similar in shape to the 'v' shaped kink of the tubular passage then frictional contact between the cutting member and a cavity wall may not occur. In this case the 'v' shaped kink of the tubular passage may not retain the cutting member and the lip may be the only mechanism retaining the cutting member within the tubular passage.

Preferably, the aperture is located away from an extremity of the tubular passage, such that the portion of the cavity wall located in between the aperture and the extremity forms the lip. An extremity of the tubular passage is understood to mean an end which terminates the tubular passage. A lip moulded into part of the cavity wall obviates the need to manufacture an additional component forming the lip. One less component provides the advantage of a reduced overall cost in manufacturing a string trimmer.

BRIEF DESCRIPTION OF THE DRAWINGS

The present invention will now be described, by way of one example only, with reference to the following drawings, of which.

DETAILED DESCRIPTION OF THE PREFERRED EMBODIMENTS

Figure 1:
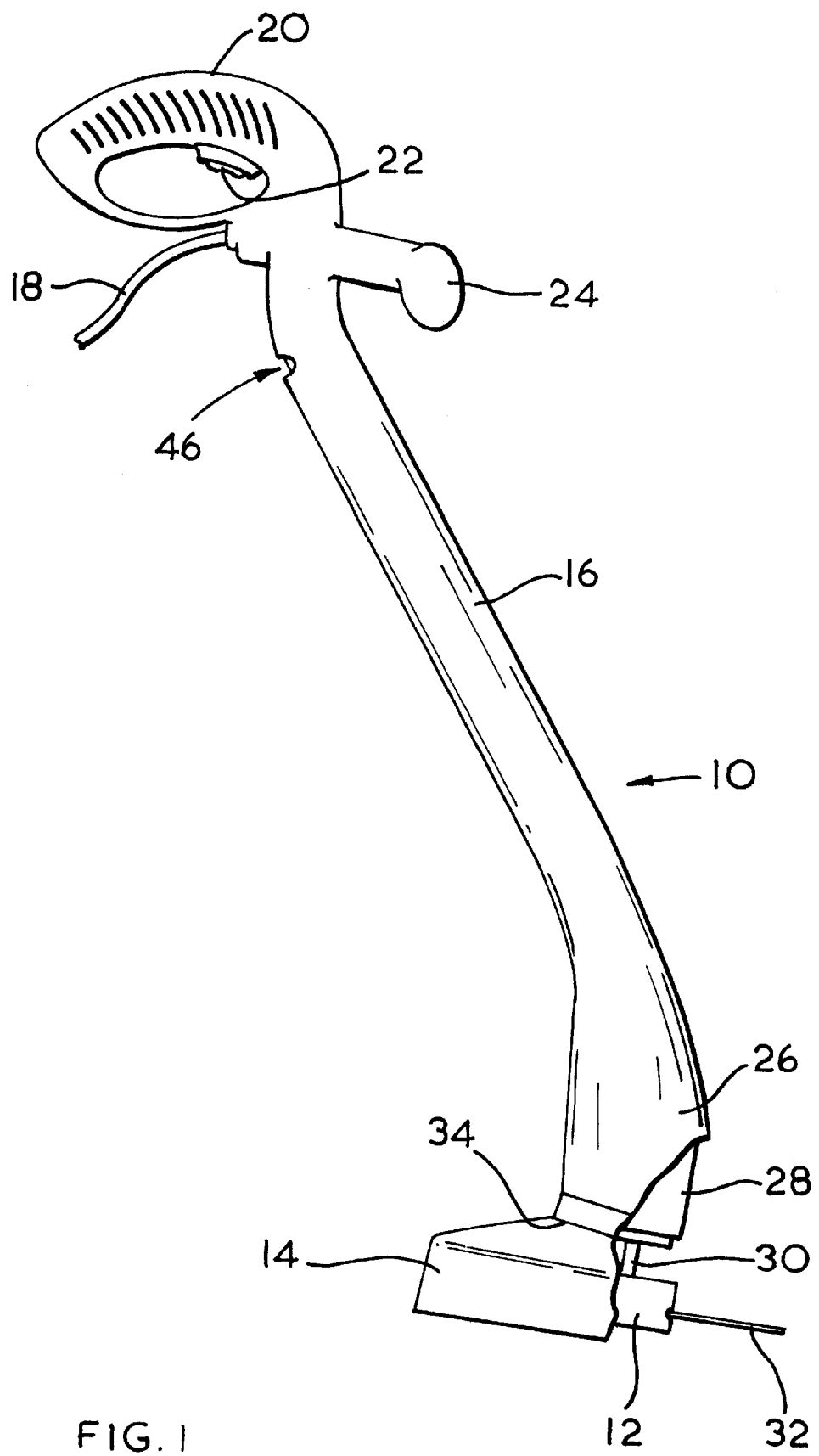
FIG. 1 shows a side view of the body of a string trimmer with part of the motor housing cut-away thus exposing the electric motor and the electric motor shaft.

Referring to FIG. 1, a string trimmer comprises a body (10), a cutting head (12), and a protection guard (14). The body (10) of the string trimmer comprises an elongate shaft (16), a rear handle (20) located at a first end of the elongate shaft (16), an electrical cable (18) which enters the body (10) at a point near to the rear handle (20) and is capable of carrying electrical current, an electrical switch (22) located upon the rear handle (20), a front handle (24) also located at the first end of the elongate shaft (16), a motor housing (26) (shown partly cut away) located at the second end of the elongate shaft (16), the motor housing (26) enclosing an electric motor (28) having a rotatable drive shaft (30). The cutting head (12) is attached to the drive shaft (30) of the electric motor (28). The cutting head (12) comprises a cutting line (32). The cutting line (12) is a length of resilient nylon filament which is detachably secured to the cutting head (12). The protection guard (14) is attached to the lower edge (34) of the motor housing (26) and partially surrounds the cutting head (12).

In operation the user holds the body (10) of the string trimmer in the upright position with the cutting head (12) close to the ground and the user supports the weight of the string trimmer by holding the rear handle (20) while guiding it with the front handle (24). The electrical current supplied by the electrical cable (18) is supplied to the electric motor (28) via the electrical switch. (22), the electrical switch (22) connecting or disconnecting the electrical supply to the electric motor (28) when operated by the user. When connected to the electrical supply the electric motor (28) is energised and rotatingly drives the drive shaft (30), the cutting head (12) and the cutting line (32). Conversely, disconnection of the electrical supply de-energises the electric motor (28) which results in the rotation of the drive shaft (30), the cutting head (12) and cutting line (32) ceasing. In use the cutting head (12) and the cutting line (32) rotate at high speed about the axis of drive shaft (30), the cutting line (32) extending radially from the cutting head (12). The path swept out by the cutting line (32) as it rotates forms a circular plane which is perpendicular to the axis of the drive shaft (30). This circular plane is hereafter referred to as the 'cutting plane'. When travelling at a high rotational speed the cutting line (32) cuts any soft vegetation or grass falling within the cutting plane. The protection guard (14) surrounds an arcuate portion of the cutting plane and is attached to the motor housing (26) on the same side as where the user is stood, thereby preventing the user from accidentally encroaching the cutting plane. On the other side of the motor housing (26) the cutting plane is not surrounded by the protection guard (14) so that the cutting line (32) can cut soft vegetation or grass brought into the cutting plane.

Figure 2:
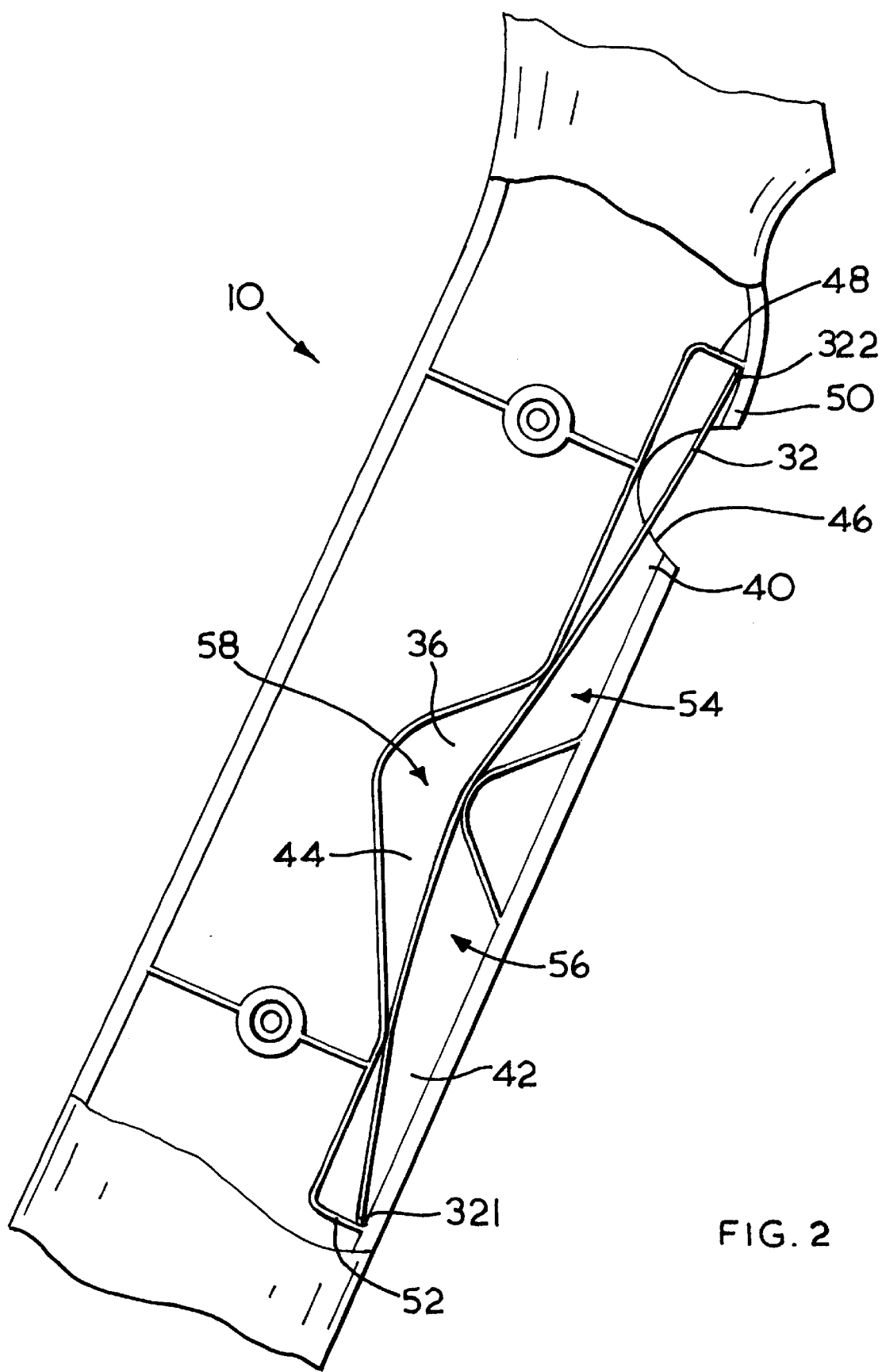
FIG. 2 shows a vertical cross sectional view of part of the body of a string trimmer comprising half a cavity for storing a cutting line.

Use of the string trimmer naturally results in wear of the cutting line (32) which will therefore need to be periodically replaced. Referring to FIG. 2, a cavity is formed by a cavity wall (36) moulded into the elongate shaft (16) of the body (10) of a string trimmer. The cavity stores a cutting line (32).

The body (10) of the string trimmer is formed by two clam-shells, one part of the cavity wall (36) being integrally moulded into the first clam-shell (38) and the other part of the cavity wall (not shown) being integrally moulded into the second clamshell (not shown) in symmetrical fashion, the complete cavity wall (36) being formed when the first clam-shell (38) and the second clam-shell are joined together. The cavity wall (36) forms a tubular passage, the tubular passage having an aperture (46) formed in the side of the cavity wall (36), through which a cutting line (32) is capable of being inserted.

The tubular passage formed by the cavity wall (36) comprises, a substantially straight first end tubular section (40) located at one end of the tubular passage, a substantially straight second end tubular section (42) located at the other end of the tubular passage and, a distorted intermediate tubular section (44) located in between the first (40) and the second (42) end tubular sections. The first end tubular section (40) and the second end tubular section (42) are substantially co-axial. The first end tubular section (40) comprises the aperture (46) and is closed at a first closed end (48). The aperture (46) is located away from the first closed end (48) such that the part (50) of the cavity wall (36) is located between the first closed end (48) and the aperture (46) thereby forming a lip. The second end tubular section (42) is also closed at a second closed end (52). The distance between the first closed end (48) and second closed end (52) is similar to the length of a cutting line (32) so that the tubular passage is capable of accommodating the entire length of a cutting line (32). However, the distance between the second closed end (52) and the point of the aperture (46) furthest from the second closed end (52) is less than the length of a cutting line (32) so that when a cutting line (32) is located in the tubular passage the lip (50) encloses one end of the cutting line (32), as shown in FIG. 2.

When viewed in cross-section the intermediate tubular section (44) characterises a curved or 'v' shaped kink. The transition in the cavity wall (36) between the first end tubular section (40) and the intermediate tubular section (44) forms a first transition zone (54) and, the transition in the cavity wall (36) between the intermediate tubular section (44) and the second end tubular section (42) forms a second transition zone (56). Located in between the first (54) and second (56) transition zones is the apex zone (58) which is the tip of the 'v' shaped kink formed by the intermediate tubular section (44). The intermediate tubular section (44) is configured such that there is no direct straight path from the first transition zone (54) to the second transition zone (56).

The purpose of the tubular passage is to store and retain a cutting line (32). To locate a cutting line (32) in the tubular passage the user inserts a cutting line (32) through the aperture (46) and pushes it through the tubular passage, the line (32) bending around the 'v' shaped kink until the first end (321) of the cutting line (32) abuts the second closed end (52). To fully locate the cutting line (32) in the tubular passage the user further bends the inserted cutting line (32) so that its second end (322) passes under the lip (50), through the aperture (46) and is enclosed by the part of the cavity wall (36) forming the inside of the lip (50) and the first closed end (48). This embodiment of the invention has three mechanisms of retaining the cutting line (32) within the tubular passage, each mechanism working independently of the other two mechanisms.

In normal use the string trimmer is upright and the aperture (46) is situated towards the top of the tubular passage. Therefore a cutting line (32) located within the tubular passage is retained due to the force of gravity. This provides a first mechanism for retaining the cutting line (32) in the tubular passage.

When viewed in cross-section the tubular passage described by the cavity wall (36) is distorted, the shape of this distortion inhibiting a straight path between the first closed end (48) and the second closed end (52) and, in particular, between the first transition zone (54) and the second transition zone (56). When a substantially straight cutting line (32) is inserted into the tubular passage via the aperture (46) it inevitably makes contact with the cavity wall (36) at the first transition zone (54), the apex zone (58) and, the second transition zone (56) because the path through these three zones is not straight. The cutting line (32) is resilient and the cavity wall (36) is rigid, therefore the cutting line (32) bends at the apex zone (58) in order to fit the non-straight line path through the first transition zone (54), the apex zone (58) and, the second transition zone (56). The resilient nature of the cutting line (32) results in it frictionally engaging the cavity wall (36), the force required to overcome the friction being sufficient to secure the cutting line (32) once located in the tubular passage. This provides a second mechanism for retaining the cutting line (32) in the tubular passage.

When a cutting line (32) is fully located in the tubular passage the first end (321) of the cutting line (32) is enclosed by the part of cavity wall (36) forming the second end tubular section (42) and, further movement of the first end (321) of the cutting line (32) within the tubular passage is blocked by the second closed end (52). The second end (322) of the cutting line (32) is enclosed by the part of the cavity wall (36) forming the first closed tubular section (40) and, further movement of the second end (322) of the cutting line (32) within the tubular passage in the opposite direction is also blocked by the first closed end (48). Additionally, the lip (50) encloses the second end (322) of the cutting line (32) thereby preventing escape of the cutting line (32) via the aperture (46). Once fully located in the tubular passage movement of the cutting line (32) along the length of the tubular passage is blocked in one direction by the second closed end (52) and, blocked in the opposite direction by the first closed end (48) while the lip (50) blocks escape of the cutting line (32) via the aperture (46). This provides a third mechanism of securing the cutting line (32) within the tubular passage.

What is claimed is:

1. A string trimmer comprising a body wherein a cavity is formed within the body, the cavity adapted to store at least one cutting member for the string trimmer; and the cavity having a cavity wall that interacts with the cutting member when the cutting member is located within the cavity such that the cavity wall secures the cutting member within the cavity.

2. A string trimmer as claimed in claim 1, wherein the cavity is formed within a shaft of the body.

3. A string trimmer as claimed in claim 1, wherein at least part or all of the body is formed by at least two moulded clam-shells, the cavity being formed by the cavity wall integrally moulded into at least one clam-shell.

4. A string trimmer as claimed in clim 3, wherin one part of the cavity wall is integrally moulded into a first claim-shell and the other part of the cavity wall is integrally moulded into a second claim-shell in substantially symmetrical fashion, the complete cavity wall being formed when the first clam-shell and the second clam-shell are joined together.

5. A string trimmer as claimed in claim 3, wherein the cavity wall forms a tubular passage having at least one aperture through which the cutting member is capable of being inserted into the tubular passage.

6. A string trimmer as claimed in claim 5, wherein the cavity wall is curved along the length of the tubular passage so that when a substantially straight resilient cutting member is located within the tubular passage, the cavity wall causes the cutting member to bend and frictionally engage the cavity wall so that the cutting member is held in the tubular passage.

7. A string trimmer as claimed in claim 6, wherein the cavity wall comprises a first straight tubular section at one end, an intermediate curved tubular section where the cavity wall describes a 'v' shape kink, and a second straight tubular section at the other end, the first and second straight tubular sections being substantially co-axial.

8. A string trimmer as claimed in claim 5, wherein a lip is formed adjacent to the aperture, the lip being adapted to retain the cutting member within the tubular passage.

9. A string trimmer as claimed in claim 8, wherein the aperture is located away from an extremity of the tubular passage, such that the portion of the cavity wall located between the aperture and the extremity forms the lip.

10. A string trimmer comprising:

a body having at least two molded clam-shells;

a cavity formed by a cavity wall integrally molded into at least one clam-shell, the cavity wall forming a tubular passage within the body and having an aperture for receiving a cutting member, the tubular passage having a shape such that the cavity wall interacts with the cutting member when the cutting member is located within the tubular passage to secure the cutting member within the tubular passage.

11. The string trimmer of claim 10, wherein the cavity is formed within a shaft of the body.

12. The string trimmer of claim 10, wherein one part of the cavity wall is integrally molded into a first clam-shell and the other part of the cavity wall is integrally molded into a second clam-shell in substantially symmetrical fashion, the complete cavity wall being formed when the first clam-shell and the second clam-shell are joined together.

13. The string trimmer of claim 10, wherein the cavity wall is curved along the length of the tubular passage so that when a substantially straight resilient cutting member is located within the tubular passage, the cavity wall causes the cutting member to bend and frictionally engage the cavity wall so that the cutting member is held in the tubular passage.

14. The string trimmer of claim 13, wherein the cavity wall comprises a first straight tubular section at one end, an intermediate curved tubular section where the cavity wall describes a 'v' shape kink, and a second straight tubular section at the other end, the first and second straight tubular sections being substantially co-axial.

15. The string trimmer of claim 10, wherein a lip is formed adjacent to the aperture, the lip being adapted to retain the cutting member within the tubular passage.

16. The string trimmer of claim 15, wherein the aperture is located away from an extremity of the tubular passage, such that the portion of the cavity wall located between the aperture and the extremity forms the lip.

* * * * *